UNITED STATES PATENT OFFICE.

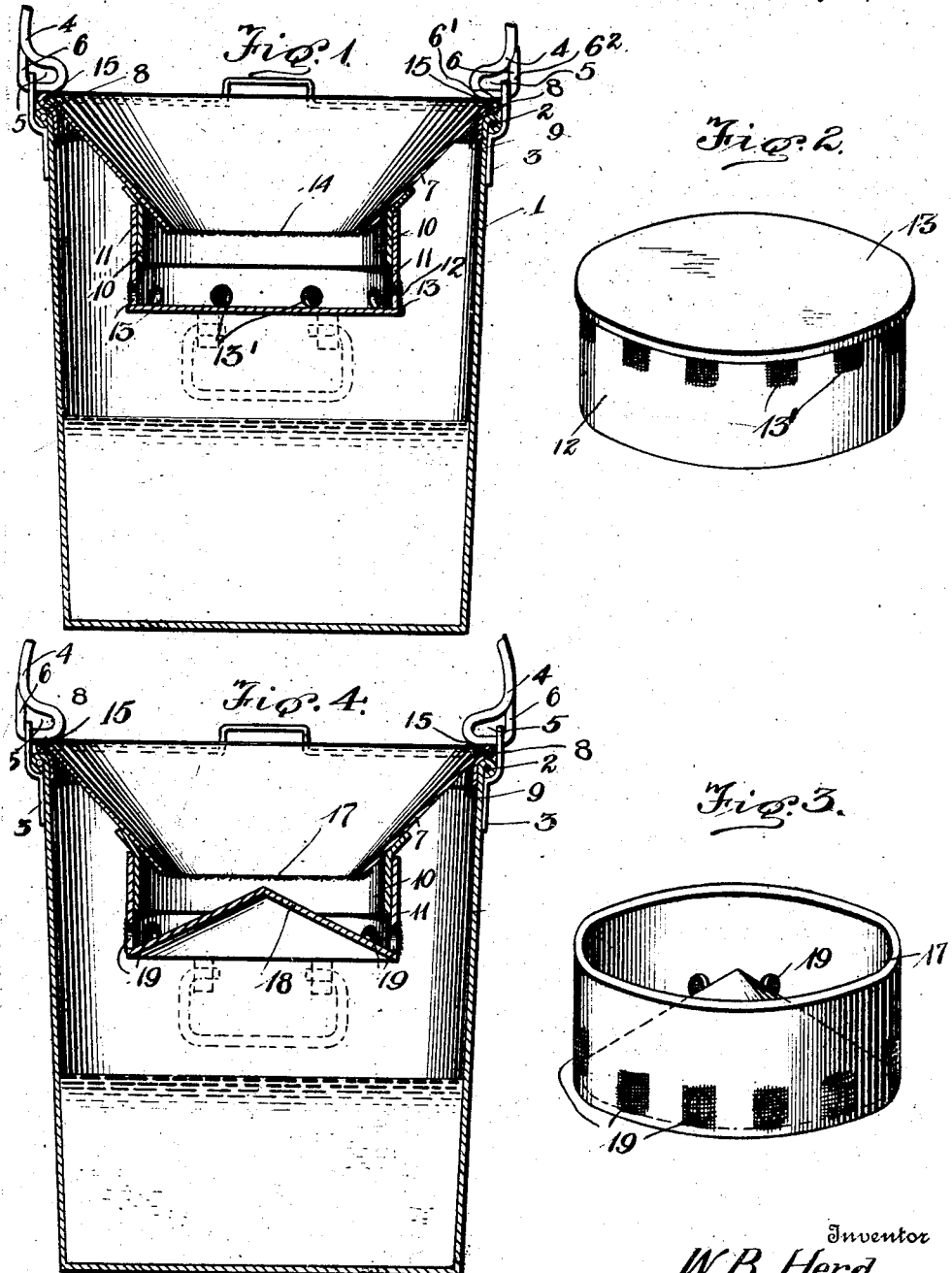

WILLIAM B. HERD, OF MILFORD, DELAWARE.

MILKING-PAIL.

1,068,900.  Specification of Letters Patent.  Patented July 29, 1913.

Application filed May 14, 1912. Serial No. 697,207.

*To all whom it may concern:*

Be it known that I, WILLIAM B. HERD, a citizen of the United States, residing at Milford, in the county of Kent and State of Delaware, have invented new and useful Improvements in Milking-Pails, of which the following is a specification.

This invention relates to milking pails and particularly to strainers therefor and has for an object to provide means for thoroughly straining the milk on its passage to the pail and for positively preventing hair or other foreign particles which may fall from the animal during the milking operation from being carried into the pail.

Another object of the invention is to provide a pail wherein the straining elements thereof can be readily separated and treated to a sterilizing bath whereby the pail can be maintained in a highly sanitary condition.

Another object of the invention is to provide a pail wherein the carrying bail will be adapted to form a lock for the straining attachment to prevent the same from accidental displacement from the pail when the latter is carried from place to place.

Another object of the invention is to provide a pail wherein one of the straining elements will be constructed with a relatively large mouth or funnel like portion whose intake end is substantially co-extensive with the width of the pail so as to enable the pail to be used from either side of the animal.

In the drawing forming a portion of this application, and in which like letters of reference indicate similar parts in the several views:—Figure 1 is a vertical section through the pail. Fig. 2 is an inverted perspective view of one of the straining elements. Fig. 3 is a similar view of the other straining elements. Fig. 4 is a section similar to Fig. 1 showing a slightly modified form of the invention.

The pail 1 is preferably of an increased diameter upwardly, being provided at its open end with a reinforcing bead 2, bail attaching ears 3 and a bail 4. The said bail has its terminals provided with eyes 5 which are operatively engaged in the ears 3 whereby the bail can be conveniently adjusted so as to lie at one side of the pail or above the same as the occasion may demand. The eyes 5 of the bail are provided with inwardly extended free spring terminals 6 for a purpose to be hereinafter described. The said free inwardly extending spring terminals 6 thence extend laterally forming an abutting horizontal portion 6' and said portion thence terminating in a vertically extending portion $6^2$ whereby closing the eyes 5 of the bail.

The straining attachment comprises a main upper element 7 which is substantially of inverted frusto-conical form so as to provide the pail with a relatively large mouth and to enable one to use the pail from either side of an animal. The walls of the element 7 are provided with a laterally disposed stop bead 8 which is adapted to rest against the bead 2 of the pail whereby the adjustment of the element is limited in one direction. This construction is also such that the bead is disposed in the path of the free terminals of the eyes 5 of the bail so as to be engaged thereby as shown in Fig. 1 of the drawing. This construction provides means whereby the straining attachment will be positively secured to the pail as will be understood. From the bead 8, the element has portions of its walls extended downwardly to form an annular flange 9 which is adapted for frictional engagement with the walls of the pail.

The small end of the element 7 is provided with a depending annular collar 10, the same being vertically disposed and adapted through frictional contact to be engaged by the annular flange 11 of a straining element 12. This element is preferably provided with an impervious bottom 13 while the flange 11 is preferably provided with an annular series of passages 13' which are covered with foraminous material or suitable straining devices and which open directly into the pail as clearly shown. The small end of the element 7 has extended thereacross and secured thereto suitable wire gage 14 which serves to initially purify the milk or to relieve the same of heavy foreign particles before the passage of the milk to the second straining element. The foraminous materials which extend across the passage 13' in the element 12 are preferably of a finer mesh than that of the gage 14 so as to positively relieve the milk of fine foreign particles.

The reinforcing wire 15 in the bead 8 of the element 7 preferably has portions 16 which are extended laterally of said element so as to form manipulating handles which will greatly facilitate the attachment of the straining device to the pail or the removal of the same therefrom.

In the modified form of the invention shown in Fig. 4 the lower straining element 17 is provided with a substantially conical bottom 18 whose walls are flared in the direction of the discharge opening 19. By constructing the bottom in this manner the milk will be held against collecting or remaining thereon.

I claim:—

1. A milk pail having its walls provided with an annular bead, a straining attachment removably fitted in the upper end of the pail and provided with an annular bead resting against the first bead and terminating downwardly for frictional engagement with the inner walls of the pail, ears carried by said pail, a bail pivoted to said ears and having its terminals formed with inwardly disposed yieldable eye portions adapted to engage and overlie the second bead when the bail is in an upright position whereby the attachment is held operatively associated with the pail and preventing any accidental displacement therefrom.

2. A milk pail having its walls provided with an annular bead, a straining attachment removably fitted in the upper end of the pail and provided with an annular bead resting against the first bead, said pail being provided with ears, a pivoted bail carried by the ears and having its terminal portions formed with eyes, the said portions of the pail constituting the eyes, bulge inwardly, thence extend laterally to form a horizontally disposed abutting portion, and thence extend upwardly and in contact with the outer side faces of the bail, the said laterally extended horizontal portion adapted to engage against and overlie the second bead when the bail is in an upright position, whereby the attachment is held operatively associated with the bead and the inner walls of the pail for preventing any accidental displacement therefrom.

In testimony whereof I affix my signature in presence of two witnesses.

WILLIAM B. HERD.

Witnesses:
 CHARLES G. FISHER,
 GEO. G. RUSSELL.